US012454043B2

(12) United States Patent
Fisher

(10) Patent No.: US 12,454,043 B2
(45) Date of Patent: Oct. 28, 2025

(54) NAIL REMOVAL SYSTEM AND METHOD

(71) Applicant: Steve Fisher, Narvon, PA (US)

(72) Inventor: Steve Fisher, Narvon, PA (US)

( * ) Notice: Subject to any disclaimer, the term of this patent is extended or adjusted under 35 U.S.C. 154(b) by 315 days.

(21) Appl. No.: 18/316,848

(22) Filed: May 12, 2023

(65) Prior Publication Data

US 2023/0364766 A1 Nov. 16, 2023

Related U.S. Application Data

(60) Provisional application No. 63/341,686, filed on May 13, 2022.

(51) Int. Cl.
*B25C 11/00* (2006.01)
*B25C 11/02* (2006.01)

(52) U.S. Cl.
CPC .................................... *B25C 11/02* (2013.01)

(58) Field of Classification Search
CPC ............................. B25C 11/02; G07F 17/3297
See application file for complete search history.

(56) References Cited

U.S. PATENT DOCUMENTS

| | | | | | |
|---|---|---|---|---|---|
| 1,563,600 | A * | 12/1925 | Walton | E21B 31/18 294/86.28 |
| 1,580,416 | A * | 4/1926 | Cromwell | B66C 1/422 294/111 |
| 1,927,528 | A * | 9/1933 | Nilsson | H01H 85/0208 81/3.8 |
| 2,706,103 | A * | 4/1955 | Stambaugh | B25C 11/02 254/19 |
| 4,477,972 | A | 10/1984 | Testa, Jr. | |

(Continued)

FOREIGN PATENT DOCUMENTS

| | | |
|---|---|---|
| CA | 2443087 A1 | 8/2004 |
| CA | 2778310 A1 | 7/2013 |

OTHER PUBLICATIONS

Bates Choice, "Bates-Nail Puller, Pliers, Nail Remover Tool, Cutting Pliers, Carpenter Tools, Staple Puller, Nail Puller Tool, End Cutting Pliers, Nail Remover, Nail Pliers Cats Paw Nail Puller, Nail Pulling", webpage, Amazon.com, ASIN B07VFVY7DR, Jul. 19, 2019, US, https://www.amazon.com/Bates-Remover-Cutting-Carpenter-Pulling/dp/B07VFVY7DR/ref=asc_df_B07VFVY7DR?tag=bingshoppinga-20&linkCode=df0&hvadid=80814196410705&hvnetw=0&hvqmt=e&hvbmt=be&hvdev=c&hvlocint=.

(Continued)

*Primary Examiner* — Lee D Wilson
(74) *Attorney, Agent, or Firm* — Jacob M. Ward; Ward Law Office LLC

(57) ABSTRACT

Embodiments of the present disclosure may include a nail removal system with a tube having an open end and a bore with an inner surface, a spring, and a gripping portion with a plurality of fingers. The tube may have a first position and second position. The gripping portion may have an opened position and closed position. The gripping portion may be in the opened position when the tube is in the first position. The plurality of fingers may be in the closed position when the tube is in the second position allowing the fingers to grip the head of a nail. The nail removal system may be operated manually, operated by a drill, or operated automatically using a robot. Advantageously, the nail removal system effectively removes a nail in a surface. A method of removing a nail from a surface using the nail removal system is also provided.

18 Claims, 7 Drawing Sheets

(56) References Cited

U.S. PATENT DOCUMENTS

| | | | | |
|---|---|---|---|---|
| 4,684,128 | A * | 8/1987 | Verstraeten | A63F 9/30 221/210 |
| 4,776,568 | A | 10/1988 | Perel | |
| 4,815,705 | A | 3/1989 | Kasugai et al. | |
| 5,611,587 | A * | 3/1997 | Brown | B66C 3/06 294/111 |
| 5,800,021 | A | 9/1998 | Derr | |
| 6,023,998 | A | 2/2000 | Frey | |
| 6,234,487 | B1 * | 5/2001 | Shoemaker, Jr. | B25J 15/0246 273/447 |
| 6,481,691 | B1 | 11/2002 | Irving | |
| 6,598,856 | B1 | 7/2003 | Puff et al. | |
| 6,840,505 | B1 | 1/2005 | Sharp et al. | |
| 7,140,087 | B1 | 11/2006 | Giltner | |
| 7,658,368 | B2 | 2/2010 | Laun | |
| 8,517,340 | B2 | 8/2013 | Pell | |
| 8,522,649 | B2 | 9/2013 | Yousufzai | |
| 8,627,751 | B2 * | 1/2014 | Parkin | A43C 7/005 81/485 |
| 2005/0062026 | A1 | 3/2005 | Holcomb | |
| 2006/0156866 | A1 | 7/2006 | Ingell | |
| 2006/0191378 | A1 | 8/2006 | Linscott | |
| 2006/0255544 | A1 * | 11/2006 | Halliburton | G07F 17/32 273/447 |

OTHER PUBLICATIONS

ANCIRS, "ANCIRS 2 Pack Stainless Steel 4-Claw Pick up Tool for Small Parts Pickup, 4 Prongs Grabber for Tiny Objects in Home, Office—IC Chip, Electronic Components, Nails Clamping-Bronze", webpage, Amazon.com, ASIN B08QVF47LV, Dec. 17, 2020, https://www.amazon.com/ANCIRS-Stainless-4-Claw-Grabber-Objects/dp/B08QVF47LV?th=1.

* cited by examiner

200

NAIL REMOVAL SYSTEM AND METHOD

CROSS-REFERENCE TO RELATED APPLICATIONS

This application claims the benefit of U.S. Provisional Application No. 63/341,686, filed on May 13, 2022. The entire disclosure of the above application is incorporated herein by reference.

FIELD

The present technology relates to a nail removal system and method thereof.

INTRODUCTION

This section provides background information related to the present disclosure which is not necessarily prior art.

Various tools can be used for removing one object from another, such as a nail from a piece of wood. An example includes a prying tool formed of a robust metallic design and coarse construction, lending it high strength in most situations but not providing as much utility in situations where more careful movements are required. Commonly, such prying tools (or crowbars) are of elongated design, constructed of heavy-gauge steel, and have one flattened end and one curved end with a flattened terminus. At either or both ends of the pry bar, the flattened portion may be configured with a notch for grasping and removing nails embedded in wood or other materials. Similarly, a hammer having a nail-removing claw may include a tapered slot configured to grasp a nail. In each case, the prying tool (be it a hammer, a pry bar, or another specialized tool) often utilizes the nail-grasping portion in conjunction with an integral fulcrum to leverage a nail or other fastener out of the material in which it is lodged.

In many contexts, a pry bar, hammer, or other prying tool is used to remove nails from various materials and surfaces. For example, nails may be used to install shingles, install metal roofing, or used generally in construction. Because nails are used in such a large quantity when shingling a roof, for example, nail removal is a task that is becoming more common in many structural renovations and/or demolition projects.

A traditional pry bar or hammer, however, is often not the right tool for certain jobs, and the nail removal operation is left incomplete or is not accomplished efficiently. For example, the prying member of such a tool may be too large to engage the nail properly, such as to provide adequate leverage for removal. Additionally, if care is not used during nail removal with such a tool, the material that holds the nail may be damaged due to uneven distribution of force or too much upward force when leverage is applied, or lateral force when the tool engages the nail, and so forth. Further, such tools require the user to exert substantial force to remove the nail. There is no spring mechanism or leverage system that can aid the user in removal.

As another option, a specialized nail-removal tool (or nail puller) may be utilized, yielding a potentially more effective removal operation. However, specialized nail remover tools frequently require the use of specialized power tools and require the user to position the nail-removal tool at very specific angles. Requiring special tools and specific angles for nail removal wastes time and money.

Accordingly, there is a need for a nail removal system that can be manually operated, operated by a standard drill, or automated, using a spring to assist in removal of the nail to save energy and time.

SUMMARY

In concordance with the instant disclosure, a nail removal system that can be manually operated, operated by a standard drill, or automated, using a spring to assist in removal of the nail to save energy and time, has surprisingly been discovered.

Embodiments of the present disclosure may include a nail removal system for a nail having a head, including a tube having an open end and a bore, a plurality of fingers disposed in the bore having a gripping portion designed to grip the head of the nail for removal, and a spring biasing the tube and the plurality of fingers to a first position or second position. The gripping portion is movable between an opened position and a closed position. The plurality of fingers is movable between a first position permitting the gripping portion of the fingers to be biased outwardly to the opened position, and the plurality of fingers is movable to a second position causing the gripping portion to be moved to the closed position by contact between the inner surface of the bore and the plurality of fingers. In some embodiments, the plurality of fingers may be coupled to a slidable member disposed within the tube and the nail removal system may include a locking mechanism configured to selectively hold the tube in one of the first position and the second position relative to the slidable member.

In some embodiments, a force may be applied to the tube to overcome the spring biasing and move the tube to one of the first position and the second position. However, the nail removal system may include a handle to provide that force. In some embodiments, the tube may also be coupled to a robot having a controller configured to move the robot to a location of the nail using a sensor for detection of the location. Further, the tube may also be coupled to a drill spindle in another embodiment.

A method of removing a nail having a head from a surface is also provided. The method including steps of providing the surface with the nail. Embodiments may also include providing a nail removal system for a nail having a head, the system including a tube, a plurality of fingers, and a spring. The method may include disposing the nail removal system adjacent the nail and moving the tube of the nail removal system from the first position to the second position. The plurality of fingers may grasp the head of the nail and the nail removal system may move away from the surface to remove the nail from the surface. Embodiments may further include moving the tube of the nail removal system from the second position to the first position and the plurality of fingers of the nail removal system may release the head of the nail for disposal of the nail. The method may also include locking the tube in the second position prior to moving the nail removal system away from the surface to remove the nail from the surface, and unlocking the tube from the second position after the nail is removed.

In other embodiments, the nail removal system may be coupled to a robot having a controller configured to move the robot to a location of the nail and the method further including a step of moving the robot to place the nail removal system adjacent the nail. The nail removal system may also include a sensor configured to detect the location of the nail and identifying a position of the nail with the sensor. In some embodiments, the nail removal system may be coupled to a drill spindle configured to remove the nail in an automated fashion.

Further areas of applicability will become apparent from the description provided herein. The description and specific examples in this summary are intended for purposes of illustration only and are not intended to limit the scope of the present disclosure.

DRAWINGS

DETAILED DESCRIPTION

Figure 1:
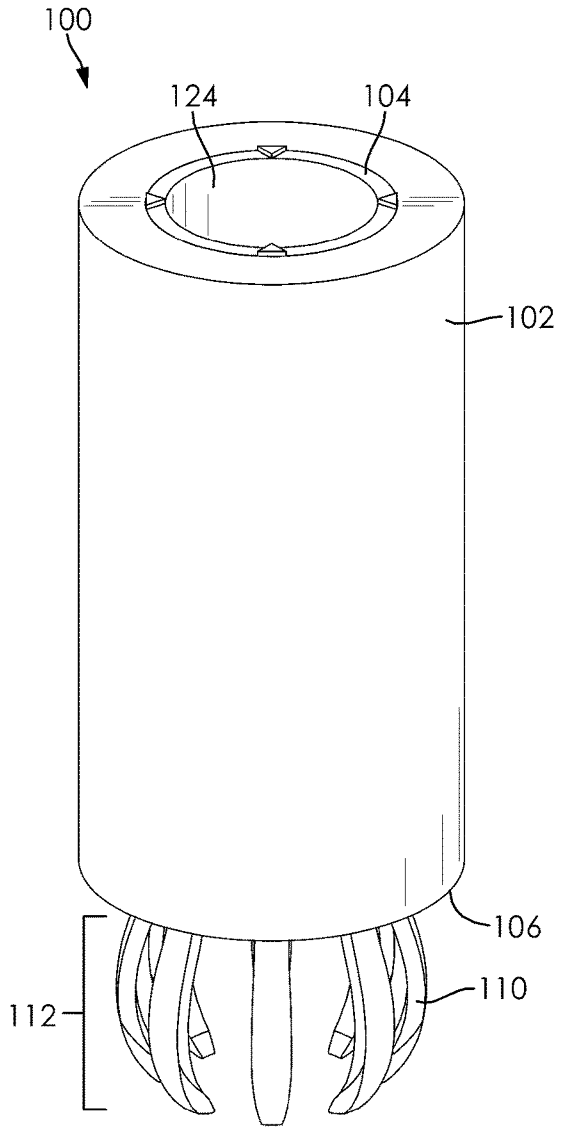
FIG. 1 is a top perspective view of a nail removal system according to one embodiment of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps may be different in various embodiments, including where certain steps may be simultaneously performed, unless expressly stated otherwise. “A” and “an” as used herein indicate “at least one” of the item is present; a plurality of such items may be present, when possible. Except where otherwise expressly indicated, all numerical quantities in this description are to be understood as modified by the word “about” and all geometric and spatial descriptors are to be understood as modified by the word “substantially” in describing the broadest scope of the technology. “About” when applied to numerical values indicates that the calculation or the measurement allows some slight imprecision in the value (with some approach to exactness in the value; approximately or reasonably close to the value; nearly). If, for some reason, the imprecision provided by “about” and/or “substantially” is not otherwise understood in the art with this ordinary meaning, then “about” and/or “substantially” as used herein indicates at least variations that may arise from ordinary methods of measuring or using such parameters.

Although the open-ended term “comprising,” as a synonym of non-restrictive terms such as including, containing, or having, is used herein to describe and claim embodiments of the present technology, embodiments may alternatively be described using more limiting terms such as “consisting of” or “consisting essentially of.” Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of “from A to B” or “from about A to about B” is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" may encompass both an orientation of above and below. The device may be otherwise oriented (rotated 90 degrees or at other orientations) and the spatially relative descriptors used herein interpreted accordingly.

The present technology relates to a nail removal system 100 and method 200 that can effectively and easily remove a nail 101 from a surface 103 using manual force or an automated force, shown generally in FIGS. 1-11.

Figure 2:
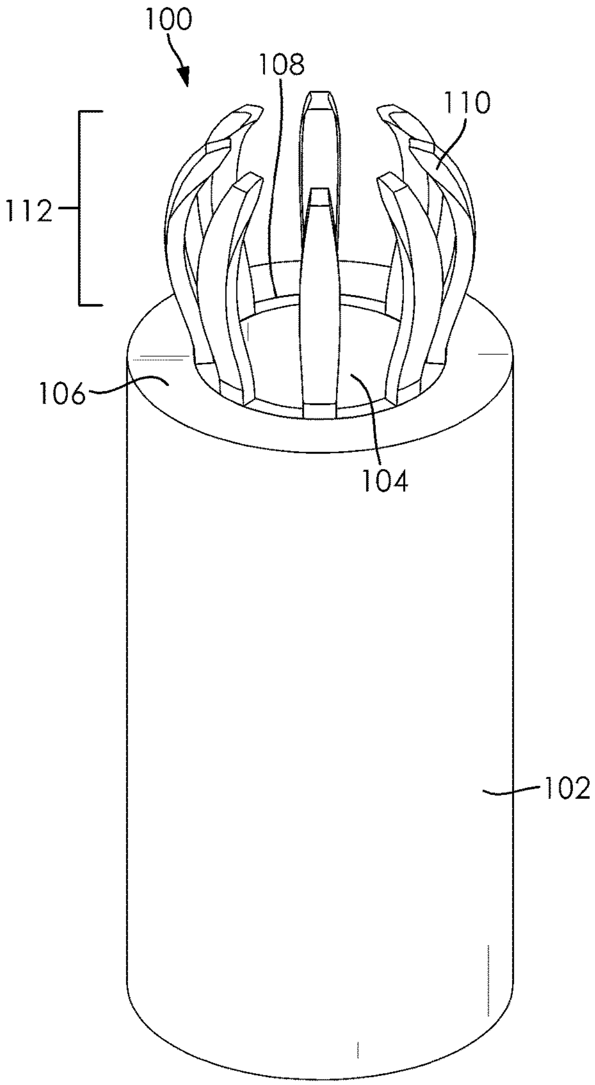
FIG. 2 is a bottom perspective view thereof.
Figure 9:
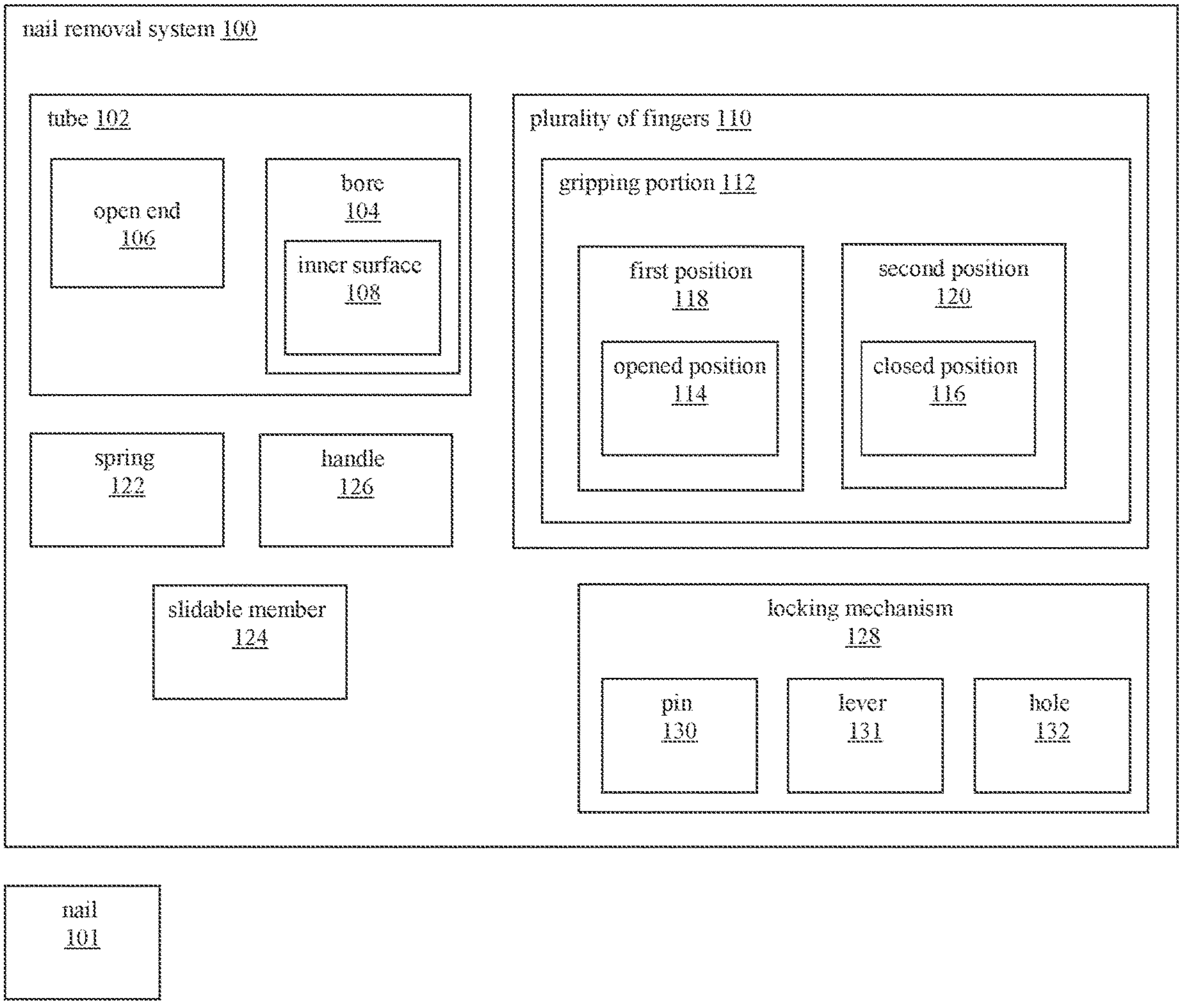
FIG. 9 is a block diagram of a nail removal system, according to an embodiment of the present disclosure.

FIGS. 1 and 2 illustrate the nail removal system 100, according to some embodiments of the present disclosure. The nail removal system 100 may include a tube 102 which includes an open end 106 and a bore 104 forming an inner surface 108. The nail removal system 100 may further include a plurality of fingers 110 disposed in the bore 104. In certain embodiments, the plurality of fingers 110 may include three fingers for gripping and removing a nail 101 in a surface 103. One of ordinary skill in the art may select a suitable number of fingers for the nail removal system 100 within the scope of the present disclosure. The plurality of fingers 110 may be formed from metal, as a non-limiting example. Advantageously, metal is very durable and provides great strength when pulling against a nail 101 in a surface 103 for removal of the nail 101. One of ordinary skill in the art may select other suitable materials to manufacture the plurality of fingers 110 within the scope of the present disclosure, including various metals and metal alloys. The nail removal system 100 may also include a spring 122 coupled to the tube 102 and the plurality of fingers 110. Additionally, a slidable member 124 may be disposed within the tube 102 and the plurality of fingers 110 may be coupled to the slidable member 124. The slidable member 124 may be a rod or a second tube, as non-limiting examples. One of ordinary skill in the art may select suitable slidable members 124 within the scope of the present disclosure. FIG. 9 is a block diagram further illustrating the nail removal system 100 of the present disclosure.

Figure 3:
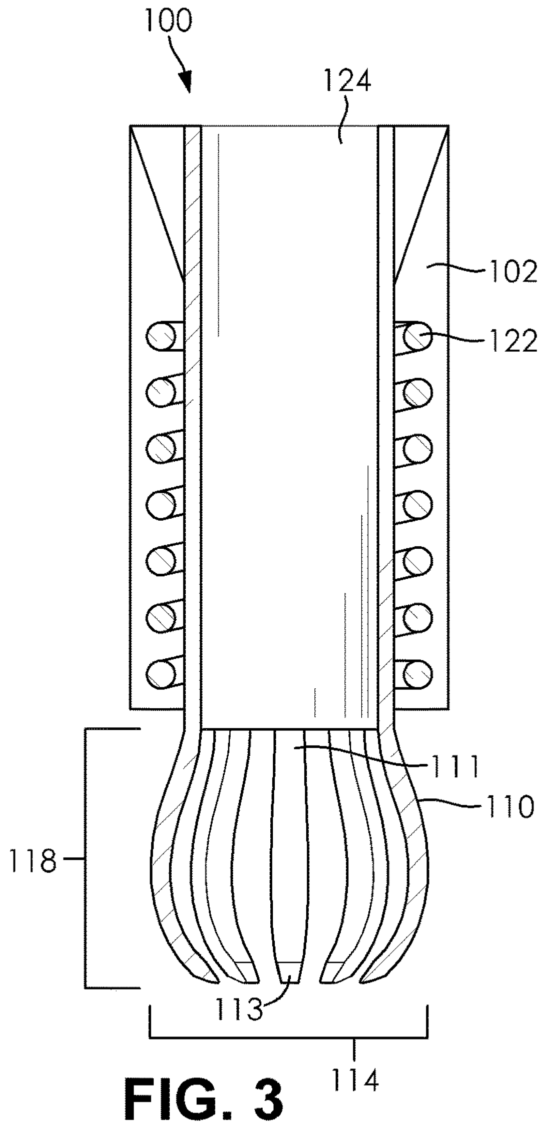
FIG. 3 is a front cross-sectional view of the nail removal system in the opened position.
Figure 4:
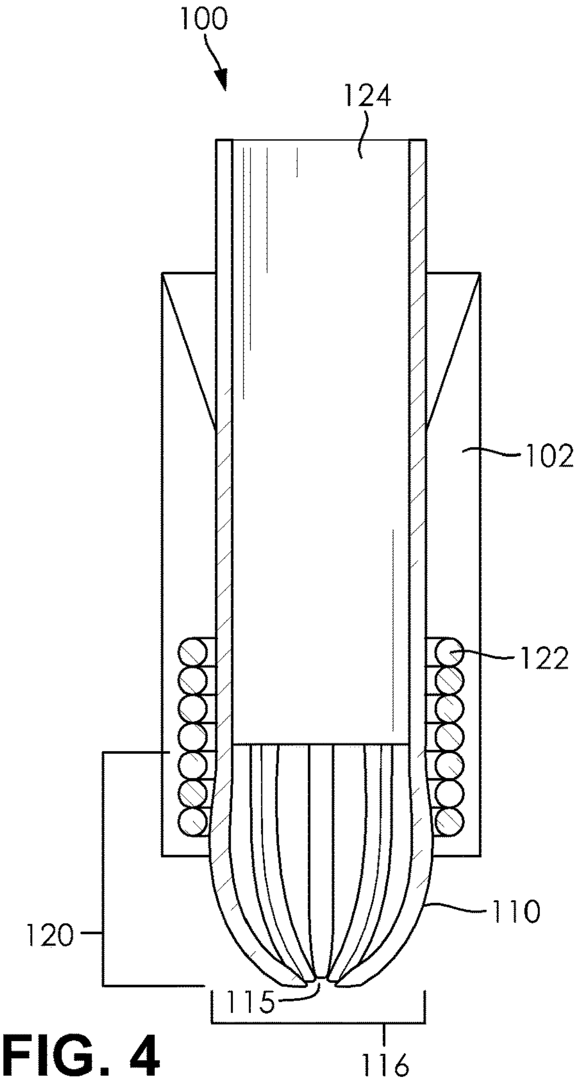
FIG. 4 is a front cross-sectional view of the nail removal system in the closed position.

With further reference to FIGS. 1, 3, and 4, the plurality of fingers 110 may include a gripping portion 112 extending through the open end 106 of the tube 102. The gripping portion 112 is movable between an opened position 114 (as shown in FIG. 3) and a closed position 116 (as shown in FIG. 4). More specifically, the gripping portion 112 is biased laterally outwardly toward the opened position 114 and designed to grip the head of the nail 101 when in the closed position 116. Advantageously, this movement of the gripping portion 112 allows the plurality of fingers 110 to gather toward a nail 101 as it is designed to accommodate, gather around, and grip the head of a nail 101 according to the size of the head of the nail 101. In certain embodiments, the gripping portion 112 can be sized to the nail 101, where the larger the size of the head of the nail 101, the larger the opening of the gripping portion 112 can be as it extends laterally outwardly until the plurality of fingers 110 can accommodate, gather around, and grasp the head of the nail 101.

Additionally, with continued reference to FIGS. 3 and 4, the plurality of fingers 110 is coaxially movable within the tube 102 between a first position 118 (as shown in FIG. 3) and a second position 120 (as shown in FIG. 4). The first position 118 permits the gripping portion 112 of the plurality of fingers 110 to be biased outwardly to the opened position 114 and the second position 120 causes the gripping portion 112 to be moved to the closed position 116 by contact between the inner surface 108 of the bore 104 and the plurality of fingers 110. In particular, the tube 102, in the second position 120, may be disposed on a portion of the plurality of fingers 110 causing the plurality of fingers 110 to gather toward the center point 115, thereby allowing the plurality of fingers 110 to grasp the nail 101. Further, each finger of the plurality of fingers 110 may have a first end 111 and a second end 113, where the first end 111 depends from the slidable member 124 and the second end 113 may be angled toward the center point 115. Therefore, when the tube 102 slides downward towards the second position 120, the tube 102 pushes against the first end 111 of each finger of the plurality of fingers 110 which brings the second end 113 of each finger of the plurality of fingers 110 towards the center point 115 to grasp the nail 101.

The spring 122 may be coupled to the tube 102 and the plurality of fingers 110. The spring 122 may surround the slidable member 124 and sit between the slidable member 124 and the inner surface 108 of the tube 102. The spring 122 biases the tube 102 and the plurality of fingers 110 toward the first position 118 (as shown in FIG. 3), which thereby requires the tube 102 to be moved to the second position 120 for movement of the gripping portion 112 of the plurality of fingers 110. Alternatively, the spring 122 may bias the tube 102 and the plurality of fingers 110 towards either the first position 118 or the second position 120. If the spring 122 biases the tube 102 and the plurality of fingers 110 towards the second position 120, the tube 102 is moved to the first position 118 to cause movement of the gripping portion 112 of the plurality of fingers 110. One of ordinary skill in the art may select which direction to bias the spring 122 for movement of the tube 102 within the scope of the present disclosure. However, a force must be applied to the tube 102 to overcome the spring 122 biasing and to move the tube 102 to one of the first position 118 and the second position 120. The force can be manual by sliding the tube 102 to the second position 120 relative to the slidable member 124 within the tube 102. Alternatively, as discussed below, the force can be automated as well.

Figure 5A:
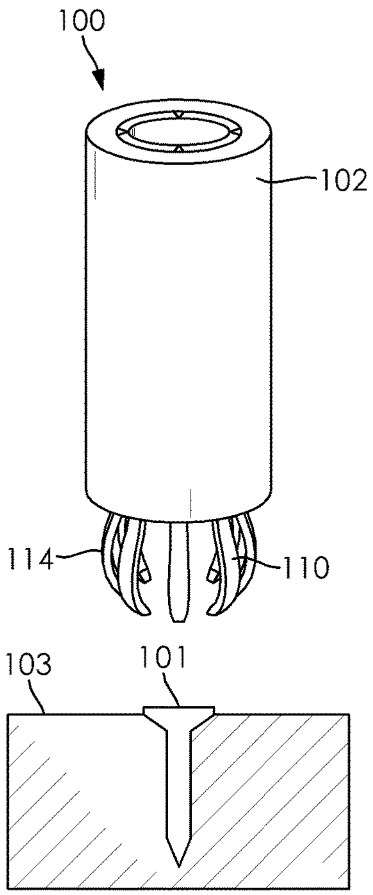
FIG. 5A is a top perspective environmental view of the nail removal system approaching a nail.
Figure 5B:
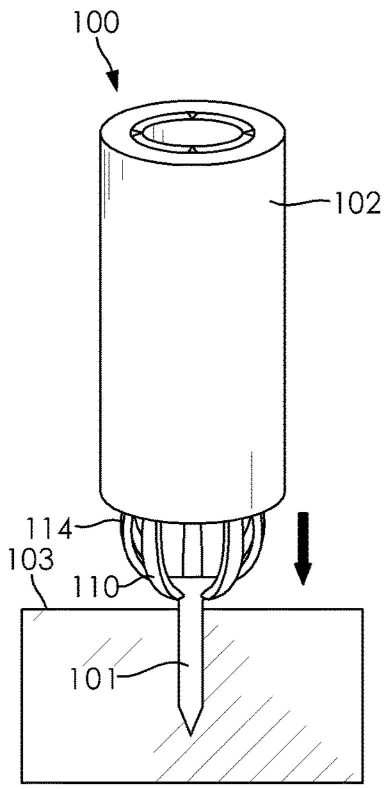
FIG. 5B is a top perspective environmental view of the nail removal system grasping a head of the nail in the surface.
Figure 5C:
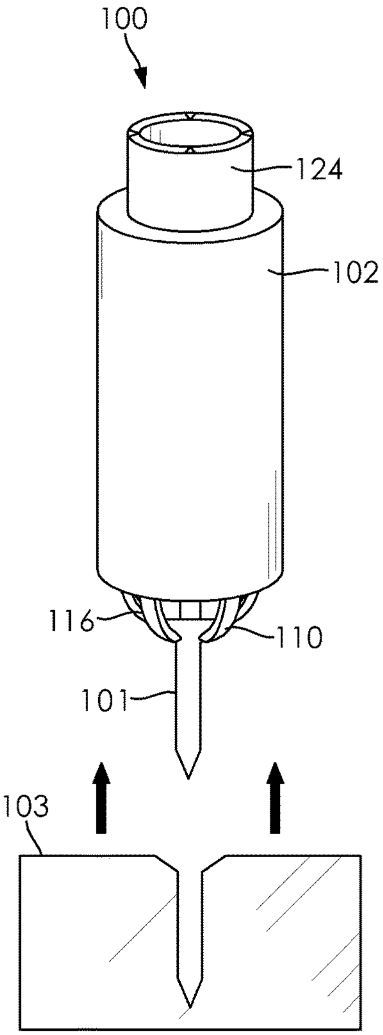
FIG. 5C is a top perspective environmental view of the nail removal system removing the nail from the surface.

FIGS. 5A to 5C illustrate a sequence of the nail removal system 100 removing a nail 101 lodged in a surface 103. The surface 103 may include a shingle, a wood surface, or a metal surface. More specifically, FIG. 5A illustrates the tube 102 of the nail removal system 100 in the first position 118 whereby the gripping portion 112 of the plurality of fingers 110 is in the opened position 114. FIG. 5B illustrates the gripping portion 112 of the plurality of fingers 110 in the opened position 114 to accommodate and gather around the head of the nail 101 in the surface 103 to prep for removal (as shown in FIG. 5C) of the nail 101. Once the tube 102 is moved to the second position 120, the gripping portion 112 of the plurality of fingers 110 grasp and engage the head of the nail 101 according to the size of the nail 101 and the plurality of fingers 110 secure the head of the nail 101 for removal. FIG. 5C illustrates the removal of the nail 101 whereby the tube 102 is in the second position 120 and the gripping portion 112 of the plurality of fingers 110 is in the closed position 116 with the nail 101 secured and captured by the gripping portion 112 of the plurality of fingers 110. In particular, the spring 122 is biasing the tube 102 to the second position 120 from the first position 118 and, as shown in FIG. 5C, the nail removal system 100 is moved away from the surface to effectively remove the nail 101 from the surface 103.

Figure 6:
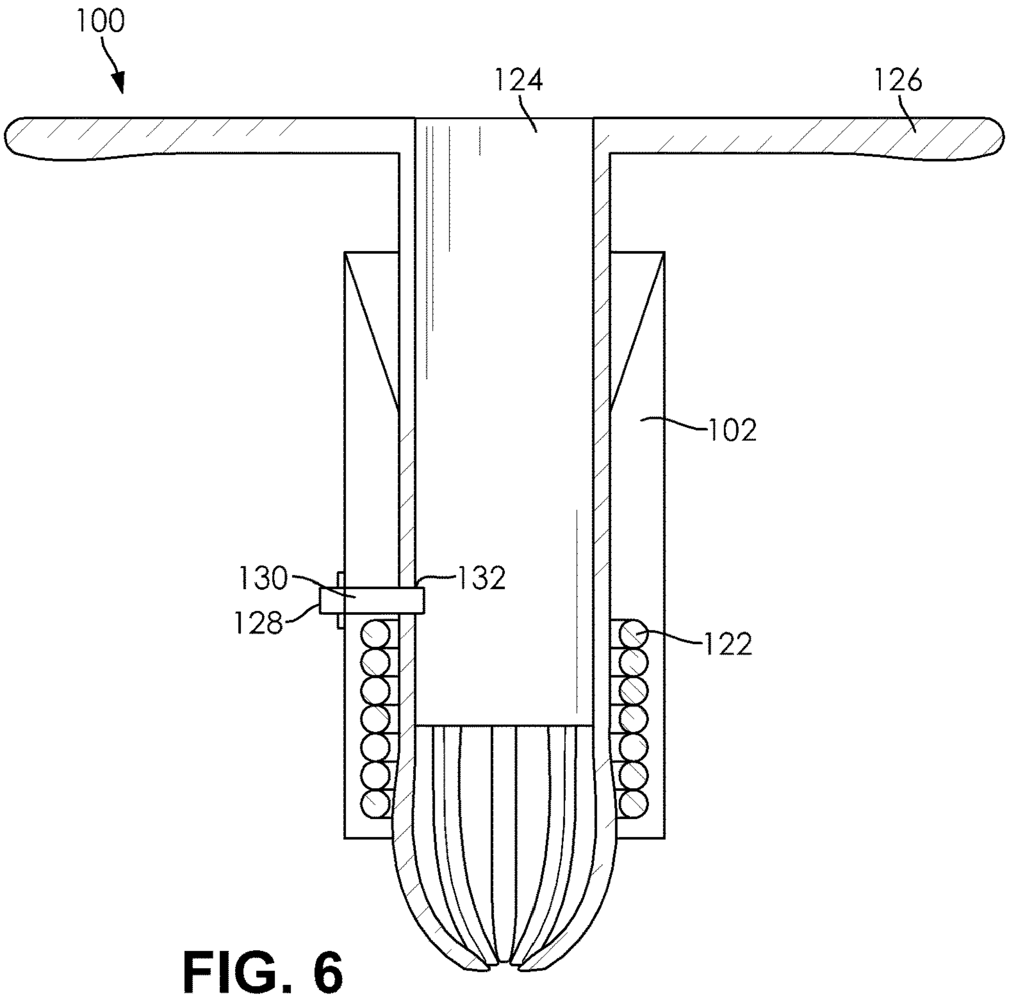
FIG. 6 is a front cross-sectional view of the nail removal system with a handle, according to an embodiment of the present disclosure.

In another embodiment, as depicted in FIG. 6, the nail removal system 100 may include a handle 126 which extends outwardly from the nail removal system 100. The handle 126 may be coupled to the slidable member 124, as shown. However, the handle 126 may be alternatively coupled to the tube 102 from the inner surface 108. One of ordinary skill in the art may select a suitable location for the handle 126 within the scope of the present disclosure, where the location may be dependent on the direction bias of the spring 122 and operation of the nail removal system 100 between the first position 118 and the second position 120. Advantageously, the handle 126 may allow a user to comfortably assist and exert manual force to the tube 102 to overcome bias of the spring 122 and move the tube 102 to the second position 120 for grasping the nail 101.

As further depicted in FIG. 6, the nail removal system 100 may include a locking mechanism 128. The locking mechanism 128 is configured to selectively hold the tube 102 in either the first position 118 or the second position 120. In some embodiments, the locking mechanism 128 may include a pin 130 and a hole 132 configured to receive the pin 130. The hole 132 may include cooperating apertures in the tube 102 and the slidable member 124, where alignment thereof permits the pin 130 to be disposed therethrough, locking the tube 102 relative to the slidable member 124. The pin 130 is configured to be selectively disposed in the hole 132 to lock the tube 102 in the second position 120 for removal of the nail 101 from a surface 103 (e.g., as shown in FIG. 5C). The pin 130 may be spring loaded and coupled to a lever 131 (as shown in FIG. 9) disposed on the tube 102. One of ordinary skill in the art may select other suitable locking mechanisms 128 within the scope of the present disclosure. Advantageously, the locking mechanism 128 allows the user to lock the tube 102 in the second position 120 prior to removing the nail 101 from the surface 103 to effectively keep the nail 101 secured and positioned within the gripping portion 112 of the plurality of fingers 110.

Figure 7:
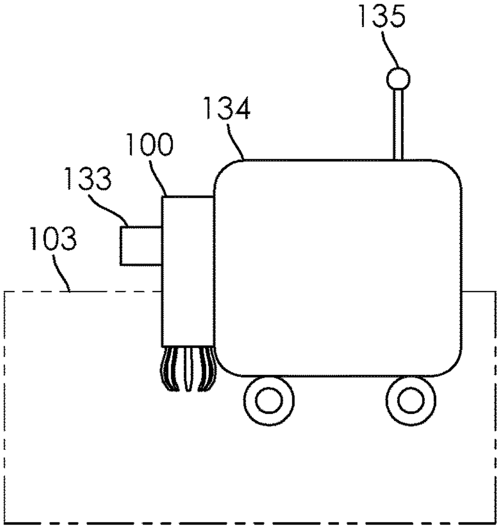
FIG. 7 is a schematic view of the nail removal system coupled to a robot, according to an embodiment of the present disclosure.

In another embodiment, as shown in FIG. 7, the nail removal system 100 may be coupled to a robot 134. The nail removal system 100 may include a sensor 133 configured to detect the location of the nail 101. For example, the sensor 133 may be coupled to the robot 134 or the tube 102. Examples of the sensor 133 may include metal detectors and/or cameras. One of ordinary skill in the art may select suitable sensors 133. The robot 134 may also include a controller 135 configured to move the robot 134 to the location of the nail 101 on the surface 103 when the sensor 133 detects the location of the nail 101 for removal on the surface 103. One of ordinary skill in the art may select a suitable robot 134 to couple with the nail removal system 100 within the scope of the present disclosure. Advantageously, the robot 134 may exert an automated force to the tube 102 to overcome the spring 122 bias and move the tube 102 to either the first position 118 or the second position 120 when the sensor 133 detects a nail 101 on a surface 103. Desirably, the robot 134 may remove several nails 101 from a surface 103 at a time as the robot 134 may be automated and does not require manual inspection of a nail 101 on a surface 103 nor manual force to remove a nail 101 from a surface 103.

Figure 8:
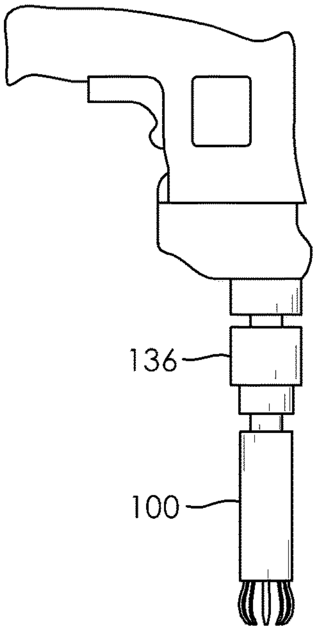
FIG. 8 is a schematic view of the nail removal system coupled to a drill spindle, according to an embodiment of the present disclosure.

As depicted in FIG. 8, another embodiment of the nail removal system 100 may be coupled to a drill spindle 136 configured to remove the nail 101. One of ordinary skill in the art may select a suitable drill spindle 136. Advantageously, the drill spindle 136 allows the nail removal system 100 to be operated automatically and to provide greater strength than manual force to remove the nail 101 from the surface 103. Desirably, a user may use the drill spindle 136 to remove a nail 101 from a surface 103 when the nail 101 requires greater strength than manual force to be removed.

Figure 10:
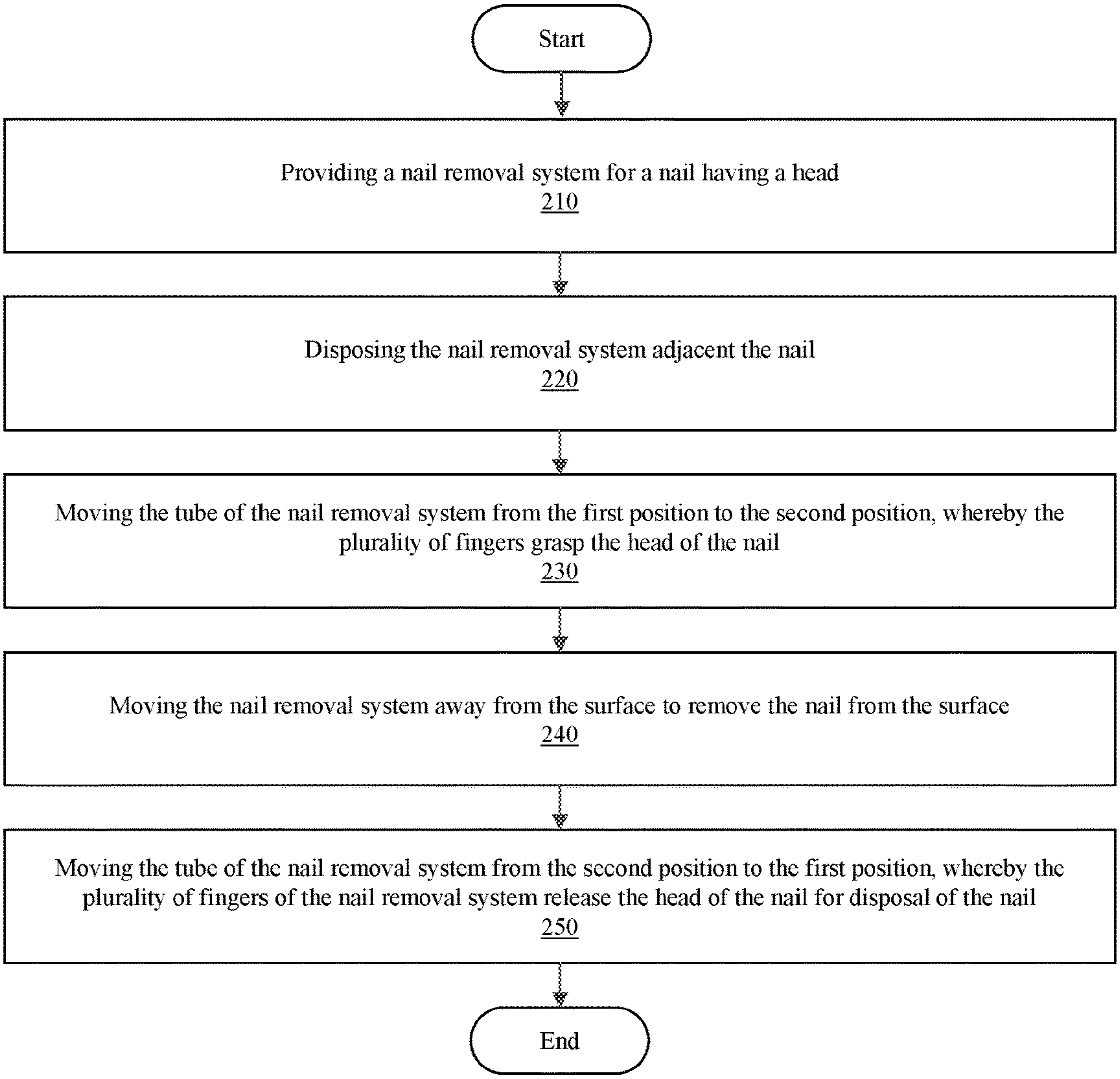
FIG. 10 is a flowchart illustrating a method of removing a nail in relation to the sequence depicted in FIGS. 5A-5C.
Figure 11:
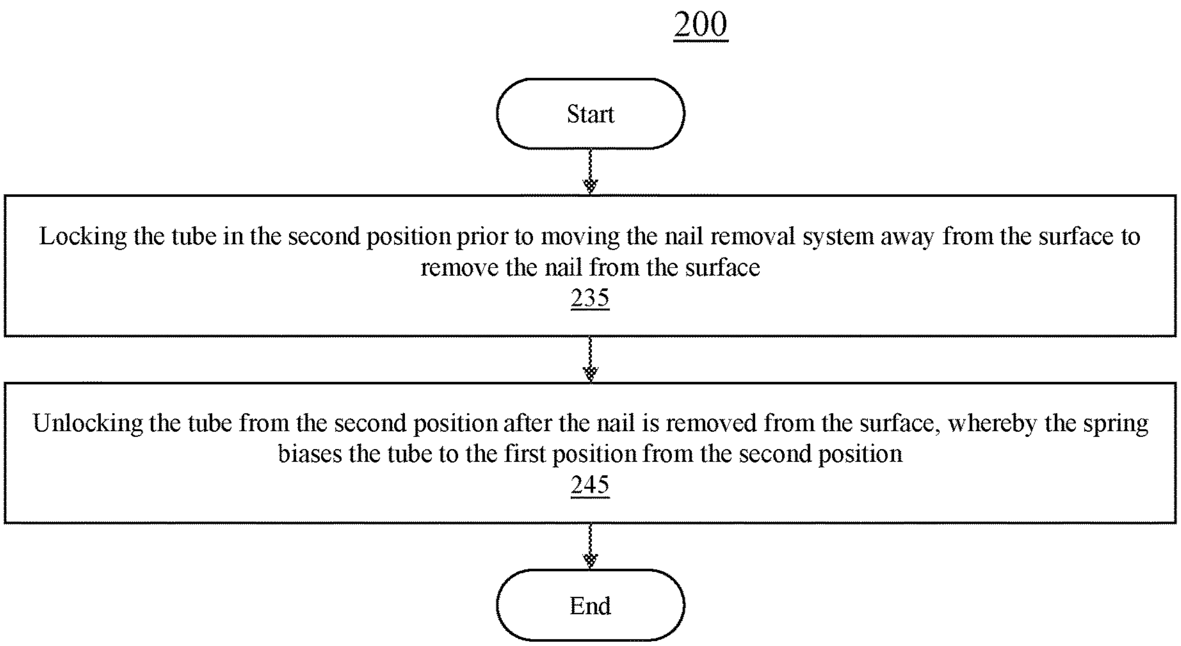
FIG. 11 is a flowchart further illustrating a method of utilizing the locking mechanism of the nail removal system thereof.

FIG. 10 is a flowchart that describes a method 200 of removing a nail 101 from a surface 103, according to embodiments of the present disclosure. At 210, the method may include providing a nail removal system 100 as described hereinabove. At 220, the method may include disposing the nail removal system 100 adjacent the nail 101. At 230, the method may include moving the tube 102 of the nail removal system 100 from the first position 118 to the second position 120 to grasp the head of the nail 101. At 240, the method may include moving the nail removal system 100 away from the surface 103 to remove the nail 101 from the surface 103. At 250, the method may include moving the tube 102 of the nail removal system 100 from the second position 120 to the first position 118 so the plurality of fingers 110 may release the head of the nail 101 for disposal of the nail 101.

In some embodiments, at 235, the method may include locking the tube 102 in the second position 120 prior to moving the nail removal system 100 away from the surface 103 to remove the nail 101 from the surface 103. In some embodiments, at 245, the method may include unlocking the tube 102 from the second position 120 after the nail 101 is removed from the surface 103 and the spring 122 biases the tube 102 to the first position 118 from the second position 120 and releases the nail 101.

In another embodiment of the method, the nail removal system 100 can be coupled to a robot 134. The sensor 133 may detect a nail 101 on a surface 103 and the controller 135 can be manually or automatically controlled to move the robot 134 to the location of the nail 101 on a surface 103. The robot 134 may place the nail removal system 100 adjacent the nail 101 and provide an automated fashion to remove the nail 101 as described in the method 200.

Alternatively, in another embodiment of the method, the nail removal system 100 can be coupled to a drill spindle 136. The drill spindle 136 may be placed adjacent the nail 101 and further provides a method of removing the nail 101 from the surface with an automated force from the drill spindle 136.

Advantageously, the nail removal system 100 may effectively and easily remove the nail 101 from the surface 103. The nail removal system 100 accommodates and grips the heads of various sized nails 101 due to the gripping portion 112 movable laterally outwardly. Further, the nail removal system 100 provides a locking mechanism 128 that holds the tube 102 in the second position 120 to allow the nail 101 to remain secured and locked within the plurality of fingers 110 for removal of the nail 101. Advantageously, the nail removal system 100 may be utilized with manual force exerted against the tube 102 to overcome the spring 122 bias for removal of the nail 101 from the surface 103. Alternatively, a user may couple the nail removal system 100 to a robot 134 to provide an efficient automated fashion of removing several nails 101 from the surface 103. Likewise, a user may couple the nail removal system 100 to a drill spindle 136 to provide an automated and stronger force to remove the nail 101 from the surface 103.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods may be made within the scope of the present technology, with substantially similar results.

What is claimed is:

1. A nail removal system for a nail having a head, comprising:

a tube having an open end and a bore forming an inner surface, wherein the tube is coupled to a drill spindle;

a plurality of fingers disposed in the bore and having a gripping portion extending through the open end of the tube, the gripping portion movable between an opened position and a closed position, the gripping portion biased laterally outwardly toward the opened position, the gripping portion configured to grip the head of the nail for removal of the nail when in the closed position, the plurality of fingers coaxially movable within the tube between a first position and a second position, the first position permitting the gripping portion of the fingers to be biased outwardly to the opened position, and the second position causing the gripping portion to be moved to the closed position by contact between the inner surface of the bore and the plurality of fingers; and a spring coupled to the tube and the plurality of fingers, the spring biasing the tube and the plurality of fingers towards one of the first position and the second position.

2. The nail removal system of claim 1, wherein the plurality of fingers is coupled to a slidable member disposed within the tube.

3. The nail removal system of claim 2, wherein the slidable member is one of a rod and a second tube.

4. The nail removal system of claim 2, wherein each finger of the plurality of fingers has a first end and a second end, the first end depending from the slidable member and the second end angled toward a center point.

5. The nail removal system of claim 4, wherein the tube, in the second position, is disposed on a portion of the plurality of fingers causing the plurality of fingers to gather toward the center point, thereby allowing the plurality of fingers to grasp the nail.

6. The nail removal system of claim 1, further comprising a locking mechanism configured to selectively hold the tube in one of the first position and the second position.

7. The nail removal system of claim 6, wherein the locking mechanism includes a pin and a hole configured to receive the pin, the pin configured to be selectively disposed in the hole to lock the tube in the second position.

8. The nail removal system of claim 7, wherein the pin is spring loaded and coupled to a lever disposed on the tube.

9. The nail removal system of claim 1, further comprising a handle.

10. The nail removal system of claim 1, wherein a force must be applied to the tube to overcome the spring biasing and move the tube to one of the first position and the second position.

11. A method of removing a nail having a head from a surface, the method comprising:

providing a nail removal system including:

a tube having an open end and a bore forming an inner surface, a plurality of fingers disposed in the bore and having a gripping portion extending through the open end of the tube, the gripping portion movable between an opened position and a closed position, the gripping portion biased laterally outwardly toward the opened position, the gripping portion configured to grip the head of the nail for removal of the nail when in the closed position, the plurality of fingers coaxially movable within the tube between a first position and a second position, the first position permitting the gripping portion of the fingers to be biased outwardly to the opened position, and the second position causing the gripping portion to be moved to the closed position by contact between the inner surface of the bore and the plurality of fingers; and a spring coupled to the tube and the plurality of fingers, the spring biasing the tube and the plurality of fingers towards one of the first position and the second position, wherein the nail removal system is coupled to a drill spindle;

disposing the nail removal system adjacent the nail;

moving the tube of the nail removal system from the first position to the second position, whereby the plurality of fingers grasp the head of the nail;

moving the nail removal system away from the surface to remove the nail from the surface; and moving the tube of the nail removal system from the second position to the first position, whereby the plurality of fingers of the nail removal system release the head of the nail for disposal of the nail.

12. The method of claim 11, further comprising locking the tube in the second position prior to moving the nail removal system away from the surface to remove the nail from the surface.

13. The method of claim 12, further comprising unlocking the tube from the second position after the nail is removed from the surface, whereby the spring biases the tube to the first position from the second position.

14. The method of claim 11, wherein the surface includes one of a shingle, a wood surface, and a metal surface.

15. A nail removal system for a nail having a head, comprising:

a tube having an open end and a bore forming an inner surface, wherein the tube is coupled to a robot, the robot having a controller configured to move the robot to a location of the nail;

a plurality of fingers disposed in the bore and having a gripping portion extending through the open end of the tube, the gripping portion movable between an opened position and a closed position, the gripping portion biased laterally outwardly toward the opened position, the gripping portion configured to grip the head of the nail for removal of the nail when in the closed position, the plurality of fingers coaxially movable within the tube between a first position and a second position, the first position permitting the gripping portion of the fingers to be biased outwardly to the opened position, and the second position causing the gripping portion to be moved to the closed position by contact between the inner surface of the bore and the plurality of fingers; and a spring coupled to the tube and the plurality of fingers, the spring biasing the tube and the plurality of fingers towards one of the first position and the second position.

16. A method of removing a nail having a head from a surface, the method comprising:

providing a nail removal system including:

a tube having an open end and a bore forming an inner surface, a plurality of fingers disposed in the bore and having a gripping portion extending through the open end of the tube, the gripping portion movable between an opened position and a closed position, the gripping portion biased laterally outwardly toward the opened position, the gripping portion configured to grip the head of the nail for removal of the nail when in the closed position, the plurality of fingers coaxially movable within the tube between a first position and a second position, the first position permitting the gripping portion of the fingers to be biased outwardly to the opened position, and the second position causing the gripping portion to be moved to the closed position by contact between the inner surface of the bore and the plurality of fingers; and a spring coupled to the tube and the plurality of fingers, the spring biasing the tube and the plurality of fingers towards one of the first position and the second position, wherein the nail removal system is coupled to a robot, the robot having a controller configured to move the robot to a location of the nail; and disposing the nail removal system adjacent the nail, wherein the robot is moved to place the nail;

moving the tube of the nail removal system from the first position to the second position, whereby the plurality of fingers grasp the head of the nail;

moving the nail removal system away from the surface to remove the nail from the surface; and moving the tube of the nail removal system from the second position to the first position, whereby the plurality of fingers of the nail removal system release the head of the nail for disposal of the nail.

17. The nail removal system of claim 16, further comprising a sensor configured to detect the location of the nail.

18. The method of claim 16, wherein:

the nail removal system further comprises a sensor configured to detect the location of the nail; and disposing the nail removal system adjacent the nail includes identifying a position of the nail with the sensor.

* * * * *